(12) United States Patent
Chaudhuri et al.

(10) Patent No.: US 7,636,707 B2
(45) Date of Patent: Dec. 22, 2009

(54) QUERY SELECTIVITY ESTIMATION WITH CONFIDENCE INTERVAL

(75) Inventors: Surajit Chaudhuri, Redmond, WA (US); Brian Frederick Babcock, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 242 days.

(21) Appl. No.: 10/818,730

(22) Filed: Apr. 6, 2004

(65) Prior Publication Data

US 2005/0228779 A1 Oct. 13, 2005

(51) Int. Cl.
*G06F 17/30* (2006.01)
(52) U.S. Cl. .............................. 707/2; 707/3; 707/104.1
(58) Field of Classification Search ....................... 707/3
See application file for complete search history.

(56) References Cited

U.S. PATENT DOCUMENTS

| | | | | |
|---|---|---|---|---|
| 5,893,090 | A * | 4/1999 | Friedman et al. ................ | 707/3 |
| 6,272,487 | B1 * | 8/2001 | Beavin et al. .................... | 707/2 |
| 6,466,894 | B2 * | 10/2002 | Takeuchi et al. ............. | 702/181 |
| 6,477,534 | B1 * | 11/2002 | Acharya et al. .............. | 707/100 |
| 6,738,755 | B1 * | 5/2004 | Freytag et al. .................. | 707/2 |
| 6,778,976 | B2 * | 8/2004 | Haas et al. ...................... | 707/2 |
| 7,139,749 | B2 * | 11/2006 | Bossman et al. ................ | 707/3 |
| 7,356,526 | B2 * | 4/2008 | Gao et al. ....................... | 707/4 |
| 7,519,529 | B1 * | 4/2009 | Horvitz .......................... | 704/7 |
| 2004/0205052 | A1 * | 10/2004 | Gloor et al. ..................... | 707/3 |
| 2005/0210023 | A1 * | 9/2005 | Barrera et al. .................. | 707/5 |

OTHER PUBLICATIONS

Swarup Acharya, Phillip B. Gibbons, Viswanath Poosala, and Sridhar Ramaswamy, Join Synopses for Approximate Query Answering, SIGMOD '99 Philadelphia PA Copyright ACM 1999, pp. 275-286.

Gennady Antoshenkov, Query Processing in DEC Rdb: Major Issues and Future Challenges, Database Systems Group, Digital Equipment Corporation USA, pp. 41-50.

Daniel Barbara, William Dumouchel, Christos Faloutsos, Peter J. Haas, Joseph M. Hellerstin, Yannis Ioannidis, H.V. Jagadish, Theodore Johnson, Raymond Ng, Viswanath Poosala, Kenneth A. Ross, and Kenneth C. Sevcik, The New Jersey Data Reduction Report, Bulletin of the Technical Committee on Data Engineering Dec. 1997 vol. 20 No. 4 IEEE Computer Society.

Surajit Chaudhuri and Vivek Narasayya, Automating Statistics Management for Query Optimizers, IEEE Transactions on Knowledge and Data Engineering, vol. 13, No. 1 Jan./Feb. 2001, pp. 7-20.

(Continued)

*Primary Examiner*—Neveen Abel Jalil
*Assistant Examiner*—Christyann R Pulliam
(74) *Attorney, Agent, or Firm*—Lee & Hayes, PLLC

(57) ABSTRACT

Selectivity estimates are produced that meet a desired confidence threshold. To determine the confidence level of a given selectivity estimate for a query expression, the query expression is evaluated on a sample tuples. A probability density function is derived based on the number of tuples in the sample that satisfy the query expression. The cumulative distribution for the probability density function is solved for the given threshold to determine a selectivity estimate at the given confidence value.

19 Claims, 4 Drawing Sheets

OTHER PUBLICATIONS

Chungmin Melvin Chen and Nick Roussopouloas, Adaptive Selectivity Estimation Using Query Feedback, SIGMOD 94- 5/94 Minneapolis, Minnesota, USA © 1994 ACM, pp. 161-172.

Francis Chu, Joseph Halpern, and Johannes Gehrke, Least Expected Cost Query Optimization: What Can We Expect?, ACM PODS Jun. 3-6, 2002, Madison, Wisconsin, USA © 2002 ACM, pp. 293-302.

Francis Chu, Joseph Y. Halpern, and Praveen Seshadri, Least Expected Cost Query Optimization: An Exercise in Utility, PODS '99 Philadelphia PA Copyright ACM 1999, pp. 138-147.

G.W. Cran, K. J. Martin, and G.E. Thomas, Applied Statistics, Journal of the Royal Statistical Society (Series C) vol. 26, No. 1, 1977, pp. 111-114.

Amol Deshpande, Minos Garofalakism and Rajeev Rastogi, Independence is Good: Dependency-Based Histogram Synopses for High-Dimensional Data, ACM SIGMOD May 21-24, 2001, Santa Barbara, California, USA Copyright 2001 ACM.

Donko Donjerkovic and Raghu Ramakrishnan, Probabilistic Optimization of Top N Queries, Proceedings of the $25^{th}$ VLDB Conference, Edinburgh, Scotland, 1999, pp. 411-422.

C. Faloutsos and I. Kamel, Relaxing the Uniformity and Independence Assumptions Using the Concept of Fractal Dimensions, Journal of Computer and System Sciences, vol. 55. No. 2, Oct. 1997, Copyright © 1997 by Academic Press, pp. 229-240.

Lise Getoor, Learning Statistical Models From Relational Data, Dec. 2001, Copyright 2002 by Geloor, Lise Carol.

Lise Getoor, Ben Taskar, and Daphne Koller, Selectivity Estimation using Probabilistic Models, ACM SIGMOD May 21-24, 2001, Santa Barbara, California, USA Copyright 2001 ACM.

Peter J. Haas, Jeffrey F Naughton, S. Seshardri, and Arun N. Swami, Selectivity and Cost estimation for Joins Based on Random Sampling, Journal of Computer and System Sciences, vol. 52, No. 3, Jun. 1996, Copyright © 1996 by Academic Press, Inc.

Peter J. Haas and Arun N. Swami, Sequential Sampling Procedures for Query Size Estimation, 1992 ACM SIGMOD—6/92/CA, USA © 1992 AMC, pp. 341-350.

Yannis Ioannidis, The History of Histograms (abridged), Proceedings of the $29^{th}$ VLDB Conference, Berlin, Germany, 2003.

Yannis E. Ioannidis and Stavros Christodoulakis, On the Propagation of Errors in the Size of Join Results, © 1991 ACM, pp. 268-277.

H.V. Hagadish, Nick Koudas, S. Muthukrishnan, Viswanath Poosala, Ken Sevcik, and Torsten Suel, Optimal Histograms with Quality Guarantees, Proceedings of the $24^{th}$ VLDB Conference New York, USA, 1998, pp. 275-286.

Ju-Hung Lee, Deok-Hwan Kim, and Chin-Wan Chung, Multi-dimensional Selectivity Estimation Using Compressed Histogram Information, SIGMOND '99 Philadelphia PA, Copyright ACM 1999, pp. 205-214.

Richard J. Lipton, Jeffrey F. Naughton, and Donovan A. Schneider, Practical Selectivity Estimation through Adaptive Sampling, © 1990 ACM, pp. 1-11.

Michael V. Mannino, Paicheng Chu, and Thomas Sager, Statistical Profile Estimation in Database Systems, ACM Computing Surveys, vol. 20, No. 3 Sep. 1988, © 1988 ACM, pp. 191-221.

Yossi Matias, Jeffrey Scott Vitter, and Min Wang, Wavelet-Bases Histograms for Selectivity Estimation, SIGMON '98 Seattle, WA, USA © 1998 ACM, pp. 448-459.

M. Muralikrishna and David J. Dewitt, Equi-Depth Histograms for Estimating Selectivity Factors for Multi-Dimensional Queries, © 1988 ACM, pp. 28-36.

Frank Olken, Random Sampling from Databases, Copyright 1993 by The Regents of the University of California.

Viswanath Poosala and Yannis E. Ioannidis, Selectivity Without the Attribute Value Independence Assumption, Proceedings of the $23^{rd}$ VLDB Conference Athens, Greece, 1997, pp. 486-495.

Viswanath Poosala, Yannis E. Ioannidis, Peter J. Haas, and Eugene J. Shekita, Improved Histograms for Selectivity Estimation of Range Predicates, SIGMOD '96 6/96 Montreal, Canada © 1996 ACM, pp. 294-305.

Kamil Saraç, Ömer Eğecioğlu, and Amr El Abbadi, Iterated DFT Based Techniques for Join Size Estimation, CIKM 98 Bethesda, MD USA, Copyright ACM 1998, pp. 348-355.

Kevin D. Seppi, J. Wesley Barnes, and Carl N. Morris, A Bayesian Approach to Database Query Optimization, ORSA Journal on Computing vol. 5, No. 4 1993 pp. 410-419.

* cited by examiner

QUERY SELECTIVITY ESTIMATION WITH CONFIDENCE INTERVAL

TECHNICAL FIELD

The invention pertains generally to the field of database query optimization and more particularly to selectivity estimation for query plan evaluation.

BACKGROUND

Modern database management systems are primarily used as components of complex software systems involving multiple applications programs. The construction and maintenance of such systems is a daunting endeavor; system architects and administrators seek a detailed understanding not only of the various individual components in the system, but also of the relationships and interactions between the components.

From a system management point of view, the consistency and predictability of a system component (such as a database management system) can be important. When system components behave predictably, tuning and testing of the entire system is greatly simplified. The efficiency of an individual component, on the other hand, is of somewhat lesser importance when the component is considered as a part of a larger system. The scalability of the system is often more significant than the component-level scalability. When a particular component is not a performance bottleneck, local performance "optimizations" to individual components can actually be detrimental to the performance of the system as a whole when such optimizations detract form the predictability of the system, making it difficult to reason about performance at the system level and take appropriate tuning measures.

The task of the query optimizer is to select a low-cost query plan. The execution cost of a query plan depends on a large number of parameters, including the sizes of the relations being queried, the selectivity of query operators, the amount of memory available at query execution time, the number concurrently executing queries, the contents of the buffer cache, and the physical layout of selected records on disk. Because many of these factors are unknown at query compilation time, the standard approach to query optimization is as follows: first, generate rough guesses as to the values of the relevant parameters, using heuristic rules or extrapolating from any available statistics. Next, using the rough guesses as input, a search algorithm is invoked to find the least costly plan. The search phase typically treats the estimated parameter values as though they were completely precise and accurate values, rather than the coarse estimates that they actually are. This may lead less predictable behavior by the optimizer when it selects a query plan that promises a quick query execution time, but is in reality based on estimated selectivity values that are generated with relatively little information and therefore low confidence. The execution time penalty when the selectivity estimate is incorrect can be significant.

SUMMARY

By specifying a desired threshold of confidence in selectivity estimation for queries a database system user or architect is able to specify a level of tradeoff between predictability and performance.

A selectivity of a query expression on a database that stores tuples is estimated by deriving a probability distribution for possible selectivity values for the query expression. The probability distribution is evaluated using a desired selectivity confidence to derive the estimated selectivity.

The probability distribution for possible selectivity values can be determined by evaluating the query expression on an appropriate precomputed random sample of database tuples to determine an observed selectivity. A probability density function can then be formed based on the observed selectivity using Bayes's rule. The probability density function can be derived, for example, by using uniform or Jeffreys prior distribution. A cumulative distribution can be inverted and solved to determine the estimated selectivity based on the desired selectivity confidence to produce a selectivity value such that the actual selectivity, with the threshold confidence, is no higher than the estimated selectivity.

To precompute the sample, tuples can be uniformly randomly sampled from a first relation in the database to form a first sample. The first sample is joined with tuples from one or more other relations in the database to which the first relation is connected transitively via foreign joins. When a query expression includes a join of the first and the one or more other relations, the query expression is evaluated on the join of the first sample and the one or more other relations.

DETAILED DESCRIPTION

Figure 1:
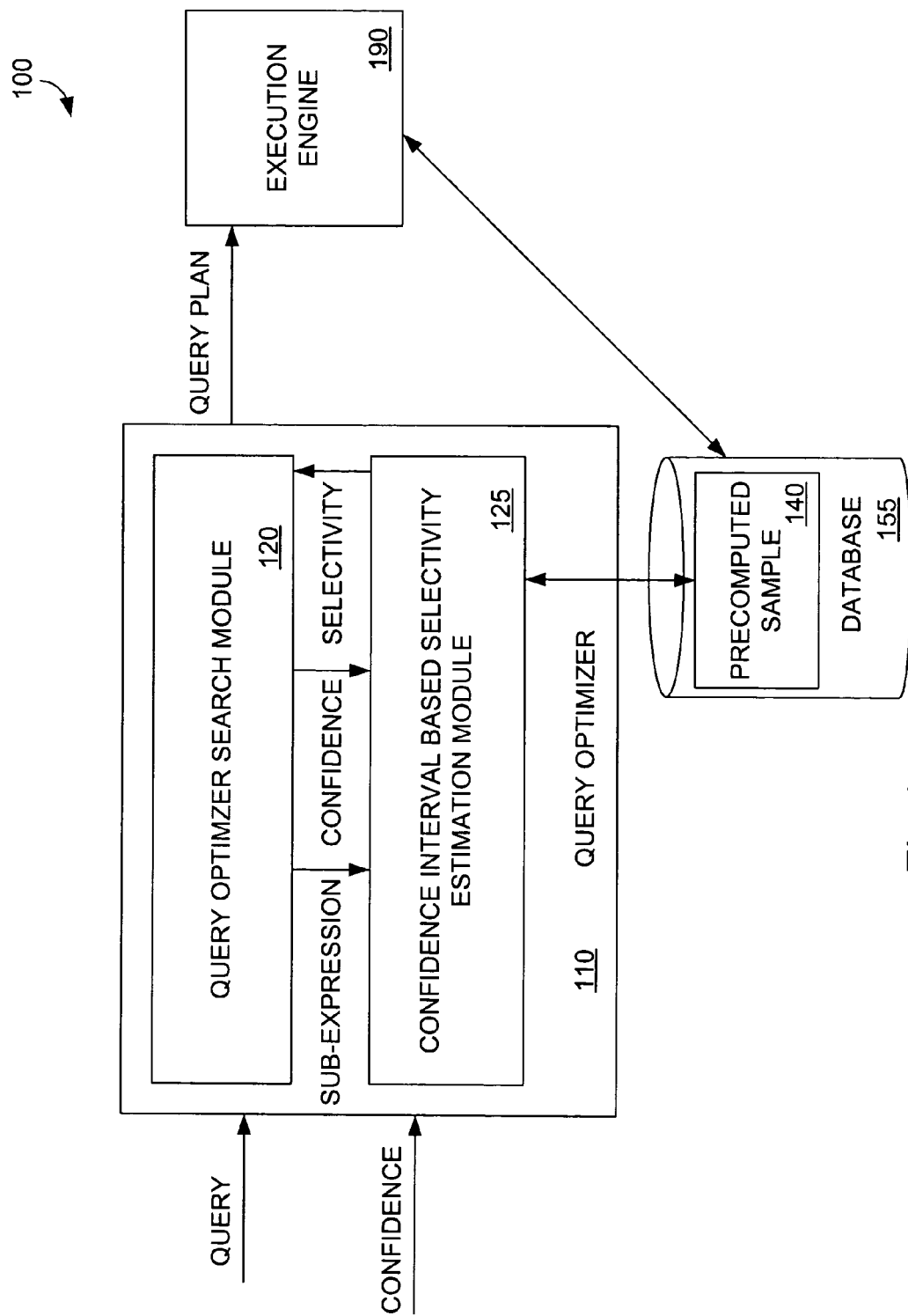
FIG. 1 is a functional block diagram of an overview of a database system that includes a confidence interval based selectivity estimation module in accordance with an embodiment of the present invention.

Selectivity estimation (also termed cardinality estimation or query size estimation) is an importance sub problem in query optimization. During query processing, the query optimizer chooses from alternative execution plans by estimating and comparing the time to execute, hence the cost of, the plans. The amount of time that a particular query plan takes to execute is dependent on the sizes of the relations accessed in the query, both the base relations stored on disk and the temporary relations produced at intermediate stages in the query plan. Therefore, accurate estimation of the size or cardinality of relations and intermediate results is important to choosing the most appropriate execution plan. The sizes of relations produced as intermediate results in a query plan can generally not be computed without first executing the query plan, so in order to produce an estimate for the cost of a query plan, the query optimizer relies on quickly-computed estimates of the sizes of intermediate relations.

One well-known approach to estimating the size of intermediate results involves the use of histograms that model the distribution of data record attribute values. Single dimensional histograms maintain a count or frequency of the number of records having an attribute value within each of a set of discrete ranges or buckets of possible attribute values. Multidimensional histograms maintain counts based on the values of more than one attribute. Histograms are accessed by the optimizer to estimate the size of intermediate results by estimating a number of database records that have a given attribute or set of attribute values. When no multidimensional histogram is available for the combination of attributes present in a query expression, the attribute value independence assumption is used to provide an estimate by multiplying selectivity estimates from separate single or multi-dimensional histograms on subsets of the attributes in the query expression.

The attribute value independence (AVI) assumption is a heuristic used by most database systems to simplify the selectivity estimation problem. Under the AVI assumption, predicates on different attributes are assumed to be independent of each other. The AVI assumption makes it easy to estimate the selectivity of a conjunction of predicates on multiple attributes by taking the product of the marginal selectivities of the individual predicates, e.g., $(Pr(A=a \wedge B=b) \times Pr(C=c))$.

There is no practical justification of the AVI assumption. It is basically an ad hoc measure that is used to simplify the selectivity estimation process, not because it accurately models real data. In fact, the AVI assumption proves to be false in many applications and is a significant source of query optimizer errors. Furthermore, in complex join queries, errors introduced by the AVI assumption are magnified each time they are propagated across sub results. Therefore, for a broad class of queries, the one-dimensional histogram used by many modern database systems may not adequately capture the necessary information about the data distribution to allow the query optimizer to choose satisfactory plans.

Multidimensional histograms have been proposed to address this shortcoming of one-dimensional histograms. However multidimensional histograms do not scale well and are often relatively inaccurate. This means that while multidimensional summaries are useful in selectivity estimation, the estimates that they provide are subject to a large degree of uncertainty. Most types of summary statistics that are used for selectivity estimation in query optimizers only provide a single-point estimate of selectivity and fail to provide information about the uncertainty of the estimate. However, knowledge about the degree of uncertainty of a selectivity estimate can be important in selecting the most appropriate query plan.

In some instances, the query optimizer obtains random samples of database tables or intermediate query results to perform estimations. Random sampling has three characteristics that set it apart from most other multidimensional summary techniques: it is very simple to implement, it is unaffected by the size of the data to be sampled, and it is effective for almost any type of query predicate. The dimensionality of the data does not affect the accuracy of random sampling, and the space required to store the sample grows linearly with the number of attributes. By comparison, the space required to store a complete set of multidimensional histograms is exponential in the number of attributes. Furthermore, histograms and other synopses that summarize data distributions generally cannot be used to estimate the selectivity of query predicates that include arithmetic expression, substring matches, or similarly complex conditions. Estimation using sampling places no restrictions on the form of the query predicate. The predicate is simply evaluated on each tuple in the sample and the number of tuples satisfying the predicate are counted. However, because this sampling typically occurs at optimization-time, it slows the optimization process.

To summarize, to estimate selectivity traditional optimizers generally perform some sort of optimization-time sampling or rely on histograms. Optimization-time sampling slows the optimization process. Single dimensional histograms, while scalable and fairly accurate, can result in estimation error due to the AVI assumption that is relied upon when they are combined. Multidimensional histograms are neither scalable nor particularly accurate. Finally, none of these techniques provides a degree of certainty with which the selectivity was estimated.

Query plans differ in their degree of sensitivity to variances in selectivity. A "risky" query plan can be characterized as having a high sensitivity to variances in selectivity, meaning that the cost of executing the plan increases radically when the selectivity estimates used to select the plan turn out to be low. Alternatively, a "stable" plan is one results in little difference in performance if the selectivity estimates are incorrect. One example that illustrates the contrast between "risky" and "stable" plans is the choice of the access method used to retrieve records form relation R that satisfy the predicate A=a AND B=b, where A and B are two indexed attributes of R. An index intersection plan that identifies the qualifying records based on the indexes and then retrieves just those records will perform well if the number of records to be retrieved is low. However, since the index intersection plan requires one random disk read per record, it fares poorly when the selectivity is high. The cost of the sequential scan plan, on the other hand, is essentially independent of the query selectivity. Of course, the optimizer often has many query plans to choose from that are neither extremely risky or stable, such as a query plan that accesses a single index in the case described above.

When selecting a query plan, the determination of whether a risky plan is sufficiently likely to be faster than a more stable plan to justify adopting the risky plan depends on the requirements of the database application of the preferences of the system user; different scenarios may call for different "standards of proof" for selecting a risky query plan. For example, a user who is issuing a series of ad hoc, exploratory data analysis queries is likely to prefer that queries be answered as quickly as possible, while being willing to wait if a few of the queries turn out to run slowly. On the other hand, for an application that involves a series of short end user interactions repeated over time, consistent query execution times may be more important. This is because users develop expectations about application responsiveness through repeated interaction, and if those expectations are violated, then users may become dissatisfied. A query that occasionally takes significantly longer than usual can lead to the perception of application performance problems, even if the execution time is low on average. Thus, in some cases, the riskier plan might be preferable whenever the evidence indicates that it would be more likely than not be the fastest alternative, while in another situation the stable plan is the preferred choice unless the risky plan could be shown beyond a reasonable doubt to be faster. There is therefore a tradeoff between predictability and expected performance, and the optimal point in the tradeoff space will vary from one application to another. The present invention allows the user to communicate his risk tolerance by allowing specification of a confidence value to be required of selectivity estimates.

Selectivity estimation plays an important role in query optimization. For some queries, a single query plan is dominant regardless of the query selectivity; however, in most cases, the best plan will be different for different selectivities. Therefore, from the point of view of the optimizer, it would be advantageous if the selectivity estimation process produced not a point estimate of selectivity, but rather a probability distribution over possible selectivities. Such a probability distribution fully quantifies the estimation uncertainty, allowing the optimizer to intelligently select the appropriate query plan after taking into consideration the relative importance of predictability and performance as specified by the user or database administrator.

Advantageously, according to the described embodiment of the present invention, a probability distribution is derived for the selectivity value by a confidence interval based selectivity estimation module (FIG. 1) and the distribution is interpreted in light of user preferences about the predictability vs. performance tradeoff to produce a single-value estimate for selectivity, suitable for consumption by an existing optimizer without requiring any changes to the query optimizer. Because the development of an industrial-strength query optimizer is so expensive, query optimizer modifications that can be easily incorporated into existing optimizers are greatly preferable to modifications that require wholesale restructuring of the optimizer. Previous work in this area has attempted to leverage additional information present in a probability distribution while keeping the basic structure of existing query optimizers intact as well. However, these previous techniques generally invoke the query optimizer multiple times as a subroutine, using different parameter values on each invocation. This technique minimizes disruption but results in an increase in optimization time by a factor equal to the number of invocations.

FIG. 1 is a functional overview of a database system 100 that incorporates a confidence interval based selectivity estimation module 125 in accordance with one embodiment of the invention. The database system 100 includes a query optimizer 110 that produces a query plan that is passed to a query execution engine 190 that executes the plan on a database 155. The query optimizer 110 features a query optimizer search module 120 that evaluates possible query plans based on information about the data in the database and selects a query plan for presentation to the execution engine. The confidence interval based selectivity estimation module 125 is called by the optimizer search module 120 to provide an estimated selectivity for a query expression currently under evaluation. The confidence interval based selectivity estimation module 125 accesses one or more precomputed samples 140 of database tuples from the database to provide an estimated selectivity as will be described in detail below.

The confidence interval based selectivity estimation module 125 enables a user to input a confidence value along with a query (or the confidence can be preset or otherwise determined by the user or a system architect) for evaluation by the database system. By inputting desired a confidence value, the user is implicitly specifying a degree of confidence in a selectivity value that should be present before choosing a "risky" query plan that may result in markedly poor performance if the selectivity value happens to be incorrect. The confidence interval based selectivity estimation module 125 operates transparently with respect to the optimizer search module 120 such that it provides a selectivity estimate in the same form as traditional systems, but unlike traditional selectivity estimates, the selectivity estimate is determined by taking into account the input confidence.

The confidence interval based selectivity estimation module 125 performs selectivity estimation using samples of the relations in the database, illustrated functionally as the precomputed sample 140. In this embodiment, the sample 140 is a collection of precomputed random samples of a fixed size, in one embodiment a few hundred tuples. The sampling procedure used to construct the sample 140 has two phases, an offline precomputation phase and a run-time estimation phase during query optimization. The precomputation phase is analogous to histogram construction; it can be triggered manually through an UPDATE STATISTICS command in SQL or performed periodically whenever a sufficient number of database modifications have occurred. The estimation phase takes place during query optimization: as the query optimizer explores the space of query plans via series of transformations, the selectivity estimation module is invoked for each relational sub-expression that is considered by the optimizer. This description focuses on select-project-joint (SPJ) query expressions where all joins are foreign-key joins for selectivity estimation. However the sampling techniques discussed herein can be expanded to cover a wide range of query expressions.

During the precomputation phase a graph is defined given the schema of the database. A graph is defined as having a vertex m corresponding to each relation $R_m$ in the schema. There is an edge from m to n if there is a foreign key dependency from relation $R_m$ to $R_n$. If a vertex has no outgoing edges, a single table uniform sample is created of the relation corresponding to the vertex. For every other vertex v, a unique sample is created by joining a uniform random sample of the relation corresponding to the vertex with relations for all vertices reachable in the graph from the vertex v. The join conditions in the joining step correspond to foreign key join conditions. The joining step is repeated for all nodes in the graph. For example, given a schema with relations R, S, T, and V such that there is a foreign key dependence from R to S, one from S to T and one from R to V. The following four samples will be created, with sample(R) denoting a sample of R, etc. . . . : 1) sample(R) ⋈ S ⋈ V; 2 sample(S) ⋈ T; 3) sample (T), and 4) sample(V), where the join conditions correspond to foreign key conditions.

In the estimation phase, during query estimation the query optimizer will request estimates for the selectivity of various relational expressions, which are assumed to be SPJ expressions with only foreign-key joins. For each such expression, the root relation R (the one whose primary key is not involved in a join) is determined and the query expression is evaluated on the appropriate sample, which is the sample that corresponds to a join between R and all relations to which it is connected using foreign key. The results of the evaluation of the query on the appropriate sample yields an observed selectivity that is used to infer a probability distribution for possible selectivity values.

A major benefit of selectivity estimation using sampling is that the selectivity of each query expression can be directly estimated from a single sample, rather than by combining uncertain selectivity estimates for sub-expressions. An example will illustrate this point. Given the query A ⋈ B ⋈ C, possibly with some selection conditions on each of the relations A, B, and C. To optimize this query, the optimizer estimates the selectivities of seven logical expressions: A, B, C, A ⋈ B, A ⋈ C, B ⋈ C, and A ⋈ B ⋈ C. When using histograms for selectivity estimation, estimates for the single-table expressions A, B, and C are computed directly, and estimates for the multi-table expressions are built up from the single-table estimates using the AVI assumption. When using sampling, the selectivity estimates for all seven expressions are computed directly from samples. Given that A has a foreign key to B which has a foreign key to C, the sample for A is used to estimate the selectivity of expressions A, A ⋈ B, A ⋈ C, and A ⋈ B ⋈ C; the sample for B is used for expressions B and B ⋈ C, and the sample for C is used for expression C. When using histogram-based techniques, the errors introduced by the AVI assumption are exponentially magnified as they are propagated across sub-results. When using random sampling, by contrast, no build-up of estimation errors occurs, because the selectivity estimates for different sub-results are computed independently from one another.

Sampling is used in the described embodiment due to the advantages above, and also because a probability distribution can be derived from a random sample in a principled manner using Bayes's rule. However, this use of sampling is but one way to derive and interpret a probability distribution for selectivity in light of user preferences about performance vs. predictability. Accordingly, any other technique that generates a probability distribution using a selectivity estimate can be employed according to the invention.

Figure 2:
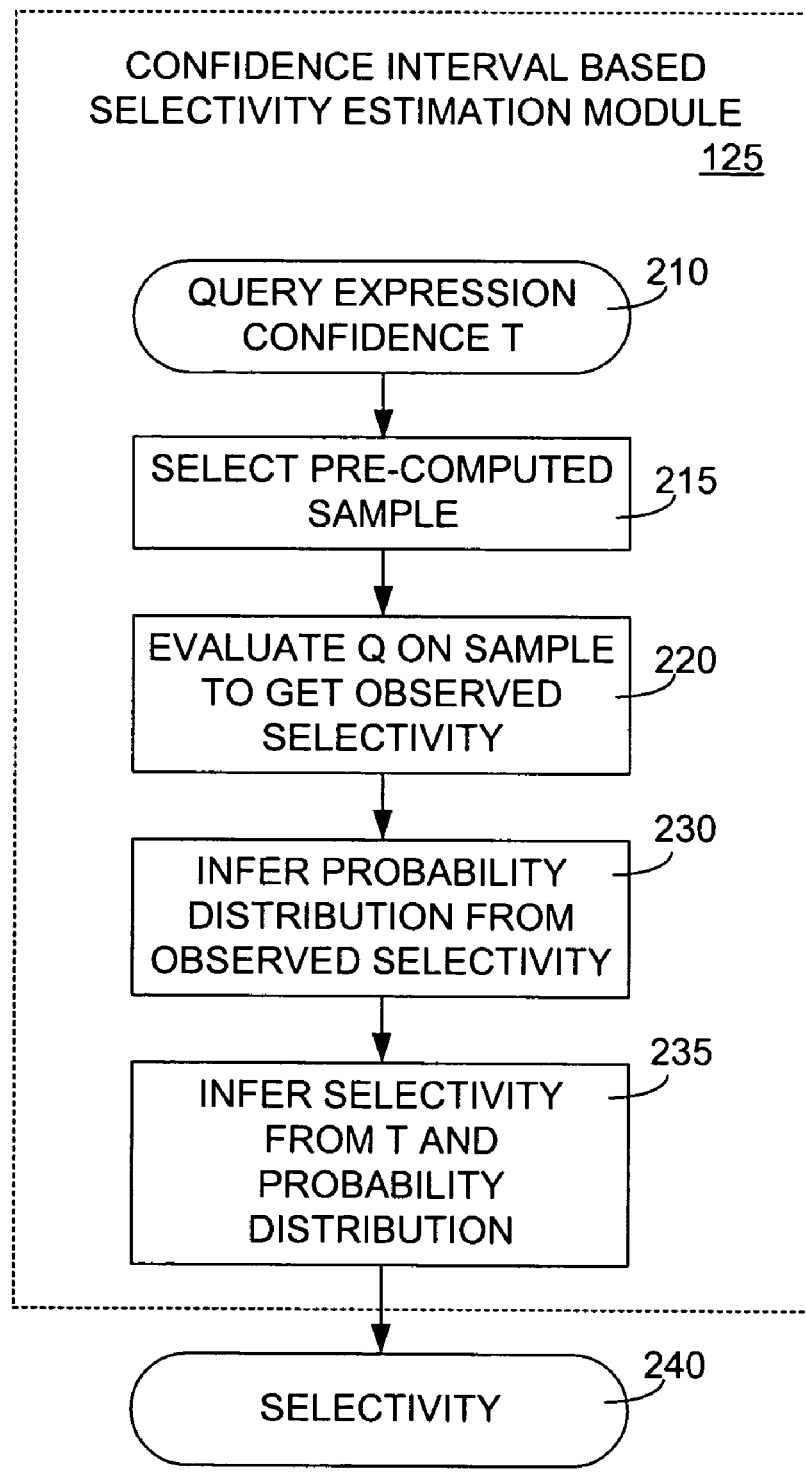
FIG. 2 is flowchart outlining a method of operation of the confidence interval based selectivity estimation module of FIG. 1.

Referring to FIG. 2, an overview of a method that can be performed by the confidence interval based selectivity estimation module 125 to determine a selectivity for a query expression Q given a desired confidence threshold T (210) is presented. At 215 an appropriate precomputed sample is selected upon which to evaluate the query to obtain an observed selectivity (220) or number of tuples in the sample that satisfy the query expression. Using the observed selectivity, a probability distribution is inferred for possible selectivity values at 230. At 235, an estimated selectivity is determined such that with T % confidence the actual selectivity will be no more than the estimated selectivity. At 240, this selectivity value is passed to the optimizer search module.

The observed selectivity is used to derive a probability distribution on selectivity (230 FIG. 2) as illustrated below. For simplicity, a single table database is considered consisting of N tuples and a sample $S=s_1, s_2, \ldots, s_n$ consists of n tuples chosen uniformly at random, with replacement, from the database. P is a query predicate that is satisfied by pN tuples where p is a fraction of the database. $x_i$ denotes the indicator variable that is equal to 1 if the ith sample tuple $s_i$ satisfies the predicate P and 0 otherwise, and X is defined as the vector $(x_1, x_2, \ldots, x_n)$. In the process of selectivity estimation, X is observed and the goal is to infer p. The unknown quantity p is treated as a random variable and the conditional probability distribution for p is determined given the observed data X.

The probability distribution for p can be represented by its probability density function $f$, which has the property that $$\Pr[a \leq p \leq b] = \int_a^b f(z)dz.$$

Therefore by integrating $f$, the probability that a selectivity of a user query will be in the given range can be determined. When performing selectivity estimation, rather than the unconditioned probability density, it is the conditional density function $f(z|X)$ that is sought. This is because the conditional density function can be integrated to determine the probability that the query selectivity falls in a particular range, given the observed data X. To calculation the conditional density, Bayes's rule is used as follows in Equation 1:

$$f(z \mid X) = \frac{\Pr[X \mid p = z]f(z)}{\int_0^1 \Pr[X \mid p = y]f(y)dy} \quad \text{Equation 1}$$

Since the unconditioned probability density function $f(z)$ occurs on the right-hand side of the above equation, in order to calculate $f(z|X)$ using Bayes's rule, $f(z)$ must be known a priori ($f(z)$ is sometimes called the prior probability). Any prior knowledge about the query workload may be used to estimate $f(z)$. However, for most database systems, prior knowledge of the workload is lacking. In this case, one possibility is to assume that all query selectivities are equally likely a priori and adopt the uniform prior distribution $f(z)=1$ for $0<z<1$.

An alternative technique that can be applied in the absence of knowledge about the actual distribution of query selectivities is to choose a non-informative prior distribution based on Jeffreys's rule. In the context of selectivity estimation from a random sample, the Jeffreys prior can be shown to be the beta distribution with shape parameters $$\left(\frac{1}{2}, \frac{1}{2}\right), \text{ i.e. } f(z) \propto z^{-\frac{1}{2}}(1-z)^{-\frac{1}{2}}.$$

For the remainder of this description, the Jeffreys prior will be used, however it will understood by those of skill in the art that any prior distribution that can be used to express a distribution of query selectivities can be used according to the invention.

The terms from Equation 1 other than the prior probability $f(z)$ are straightforward to compute. Given that k tuples form the sample satisfy the predicate P, i.e, $$\sum_{i=1}^n x_i = k$$

then because the sample tuples are selected independently and uniformly at random from a population of tuples in which a fraction p satisfy the query predicate and a fraction 1-p do not, the variables $x_i$ are independently and identically distributed Bernoulli random variables and therefore $\Pr[X|p=z]=z^k(1-z)^{n-k}$. The quantity in the denominator of Equation 1, $$\int_0^1 \Pr[X \mid p = y]f(y)dy,$$

is independent of z so it can be treated as a normalizing constant.

Combining the expression for $f(z)$ with the expression for $\Pr[X|p=z]$ and normalizing yields the following formula for the probability density of p conditioned on X:

$$f(z \mid X) = \frac{z^{k-\frac{1}{2}}(1-z)^{n-k-\frac{1}{2}}}{\int_0^1 y^{k-\frac{1}{2}}(y-z)^{n-k-\frac{1}{2}}dy} \quad \text{Equation 2}$$

Figure 3:
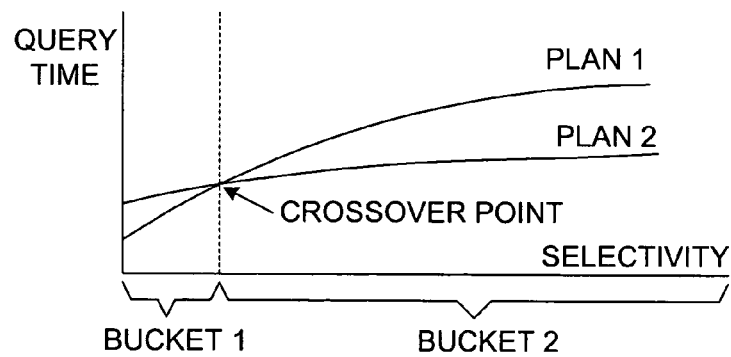
FIGS. 3-5 are graphical depictions of examples of operation of the confidence interval based selectivity estimation module of FIG. 1.

Equation 2 is the beta distribution with shape parameters $(k+\frac{1}{2}, n-k+\frac{1}{2})$ and is used to derive a single-value selectivity estimate as follows. In general, the space of possible selectivity values will be characterized by one or more crossover points that separate the ranges of selectivities where different plans dominate. For a given crossover point, if the selectivity is less than the crossover value, then one query plan is most efficient, while, if the selectivity is greater than the crossover value, a different plan will perform better. When the selectivity falls exactly at the crossover point, either of the two alternatives is equally good. FIG. 3 illustrates two query plans and their query execution time as a function of selectivity. The crossover points can be viewed as defining a set of buckets, and as long as two selectivity estimates fall within the same bucket, the two estimates are equivalent in that both will result in the choices of the same query plan.

The query optimizer's decision between query plans in the prior example has been characterized as a choice between a "safe" sequential scan plan and a "risky" index intersection plan. It was suggested that the query optimizer should require some amount of evidence suggesting that the query selectivity is below the crossover value before deciding to select the risky plan. Optimization strategies can be placed on a continuum from conservative to aggressive depending on the amount of evidence required for the risky plan to be selected. A strategy that only selects the risky plan when there is very strong evidence that selectivity is below the crossover point is conservative, while a strategy that will choose the risky plan based on relatively little evidence is aggressive. Conservative strategies tend to err on the side of caution, and therefore may miss some opportunities to return a speedy response when the selectivity turns out to be low, while aggressive strategies may too often choose the risky plan, and when selectivity turns out to be higher than estimate, the price of slow query response is paid.

When the available evidence about selectivity is expressed as a probability distribution, one possible way to measure the weight of the evidence suggesting the selectivity to be low is to calculate the probability that the query selectivity will be less than a given selectivity. Based on this probability, the query optimizer can decide which query plan to select. Referring again to FIG. 3, the query has one crossover point, which defines two selectivity buckets. To choose the best plan for his query, the following approach is followed: for some confidence threshold T % is the probability that the selectivity is less than the crossover point exceeds T % then select the query plan that is best for the low-selectivity bucket (Plan 1 in FIG. 3) and otherwise chose the best plan for the high-selectivity bucket (Plan 2). Choosing T=50% leads to a neutral strategy; however, this not the only possible approach. By varying the confidence threshold required for query-planning decisions to be based on the low-selectivity bucket, the query optimizer can adopt a conservative strategy (favoring the high-selectivity bucket) or an aggressive strategy (favoring the low-selectivity bucket). The reason that a bias towards the higher-selectivity buckets can be construed to be a conservative strategy is that optimal plans for lower selectivities will generally be riskier than optimal plans for higher selectivities, in the sense that their running time will be more strongly dependent on the query selectivity. This relationship must at least hold in the region near the crossover point, or else no crossover would occur and one plan would dominate.

An apparent difficulty to implementing the approach suggested in the preceding paragraph is that existing query optimizers do not provide an efficient way to determine the crossover points where the optimal query plan changes. The query cost functions used by modern database systems are often quite intricate, and cost estimation modules are not usually designed to expose the cost function in an explicit functional form. Instead, cost estimation modules are optimized to quickly evaluate the cost function for a single setting of the relevant parameters. Therefore, to construct a chart such as that in FIG. 3 would require a very large number of evaluations of the query cost function and is not feasible.

However, the described approach addresses the difficulties above as follows. Given a confidence threshold T %, the selectivity level s for which there is a T % probability that the true query selectivity is at most s can be used to select the best query plan for selectivity s. The probability that the selectivity is at most s is given by the cumulative distribution function (cdf) for selectivity. The cdf for a probability distribution with density $f(z|X)$ is defined as $$cdf(z) = \int_0^1 f(y|X) dy.$$

Calculating the desired selectivity s then requires inverting the cumulative distribution function (cdf) for selectivity: $cdf(s)=T\%$, so $s=cdf^{-1}(T\%)$ (see 230 in FIG. 2). Since the probability distribution resulting from the estimation procedure described above has the functional form of a beta distribution, inverting the cdf for selectivity requires computing the inverse of the cdf of the beta distribution. This can be efficiently computed numerically. (See, for example, G. W. Cran, *Remark AS R19 and Algorithm AS* 109, *a Remark on Algorithms AS63: The Incomplete Beta Integral, AS* 64, *Inverse of the Incomplete Beta Integral, AS* 64, *Inverse of the Incomplete Beta Function Ratio in Applied Statistics*, 26(1): 111-114, 1977). Once s has been determined (235 in FIG. 2), the desired plan can be generated by invoking the standard query optimizer with a single-value selectivity estimate of s.

As already discussed, FIG. 2 outlines a technique that can be used to estimate a selectivity value s of a query expression Q with a confidence of T %. An appropriate precomputed sample is determined, based on the relations involved in the query expression. The query expression is evaluated on the sample (215) to infer a probability distribution for the actual selectivity given the selectivity observed for the sample at 220. The proper confidence threshold T % is chosen based on user preferences and the selectivity $s=cdf^{-1}(T\%)$ is computed at 230 using the probability distribution inferred from the observed selectivity determined at 220. The computed value of s is return to the query optimizer as the estimated selectivity of the query predicate at 240.

The following examples will illustrate the above estimation procedure and explain the impact of the sample size, the choice of prior distribution, and the confidence threshold on selectivity estimation. If 10 tuples from a 100 tuples sample satisfy the query predicate for some query Q, Equation (2) holds that the probability density function for the query selectivity $f(z|X)$ is proportional to $z^{9.5}(1-z)^{89.5}$. If the uniform distribution was used as the prior distribution instead of the Jeffreys prior, the resulting probability density would be slightly different.

Figure 4:
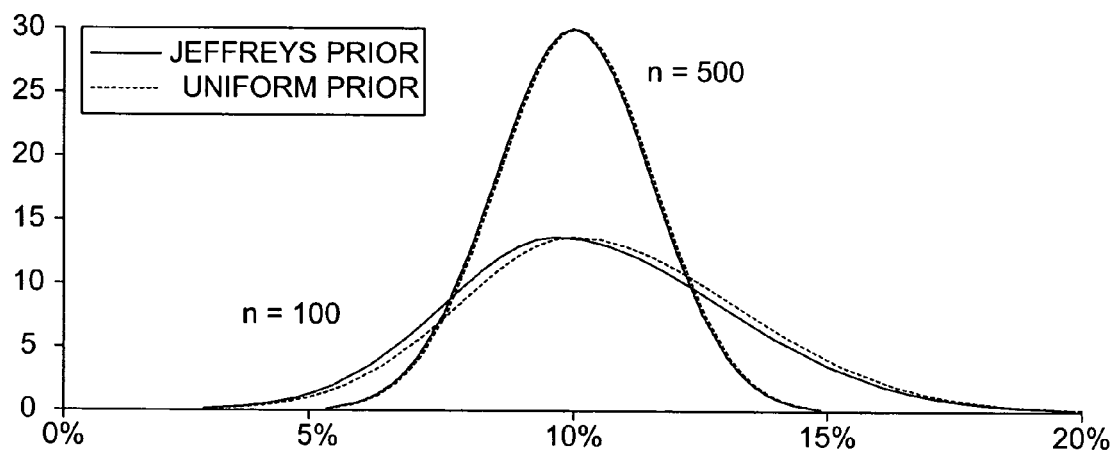

FIG. 4 shows the density functions for the probability distributions resulting from the two different priors resulting from the uniform prior and the Jeffreys prior. FIG. 4 also illustrates the probability distributions that would result form using the uniform or Jeffreys prior to interpret a sample of 500 tuples, of which 50 satisfy the query expression. Although the support of $f(p|X)$ goes from 0 to 1, the x axis in FIG. 4 is truncated at 0.2 since the probability of a selectivity higher than 20% is negligible in this scenario. As can be seen from FIG. 4, even for a small sample of 100 tuples, the choice of prior distribution makes little difference. For larger sample sizes, the uniform and Jeffreys priors produce almost identical results. The size of the sample used, however, does have a noticeable impact on the probability distribution produced. When the sample is large, the probability distribution is tightly concentrated, whereas the probability distribution for the smaller sample is more spread out. Therefore it can be surmised that a larger sample provides more evidence about the selectivity, and thus the uncertainty is less when the sample is larger.

FIG. 4 shows how the confidence threshold affects the interpretation of the probability distribution for selectivity.

Figure 5:
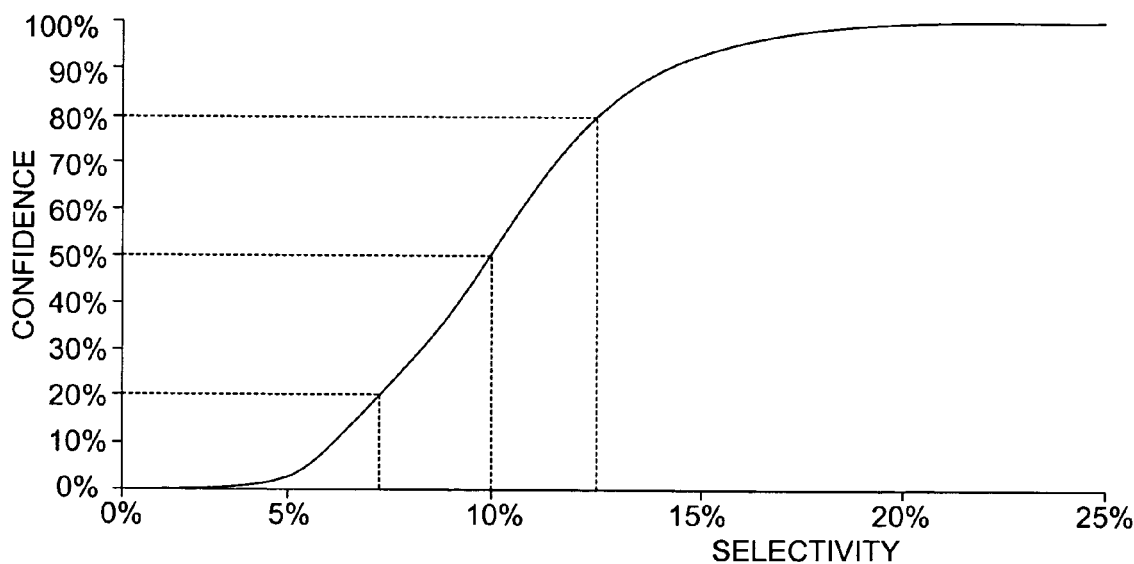

The figure plots the cdf for the probability distribution generated from the 100 tuple sample using the Jeffreys prior. The dashed lines in FIG. 5 illustrate three potential confidence thresholds: 20%, 50%, and 80%. If a confidence threshold of 20% is used, then the result of selectivity estimation with be 7.8%, because there is a 20% chance that the query selectivity is 7.8% or less. If a 50% confidence threshold is used, then the selectivity estimate produced will be 10.1%, which is close to the maximum likelihood estimate of 10%. An 80% threshold results in an estimated selectivity of 12.8%. If a larger sample size were used, the impact of the confidence threshold on the selectivity estimate would be smaller because the probability distribution would be more tightly concentrated about its medium.

Exemplary Operating Environment

The database system 100 described above includes a confidence interval based selectivity estimation module 125 constructed in accordance with one exemplary embodiment of the invention. Most typically, the database system 100 is constructed in software executing on a computer system 20 (FIG. 6) such as a server computer which in turn is coupled to other servers or computers on a network. A computer system 20 that can serve as a server or database computer is depicted in FIG. 6 and described in greater detail below.

Figure 6:
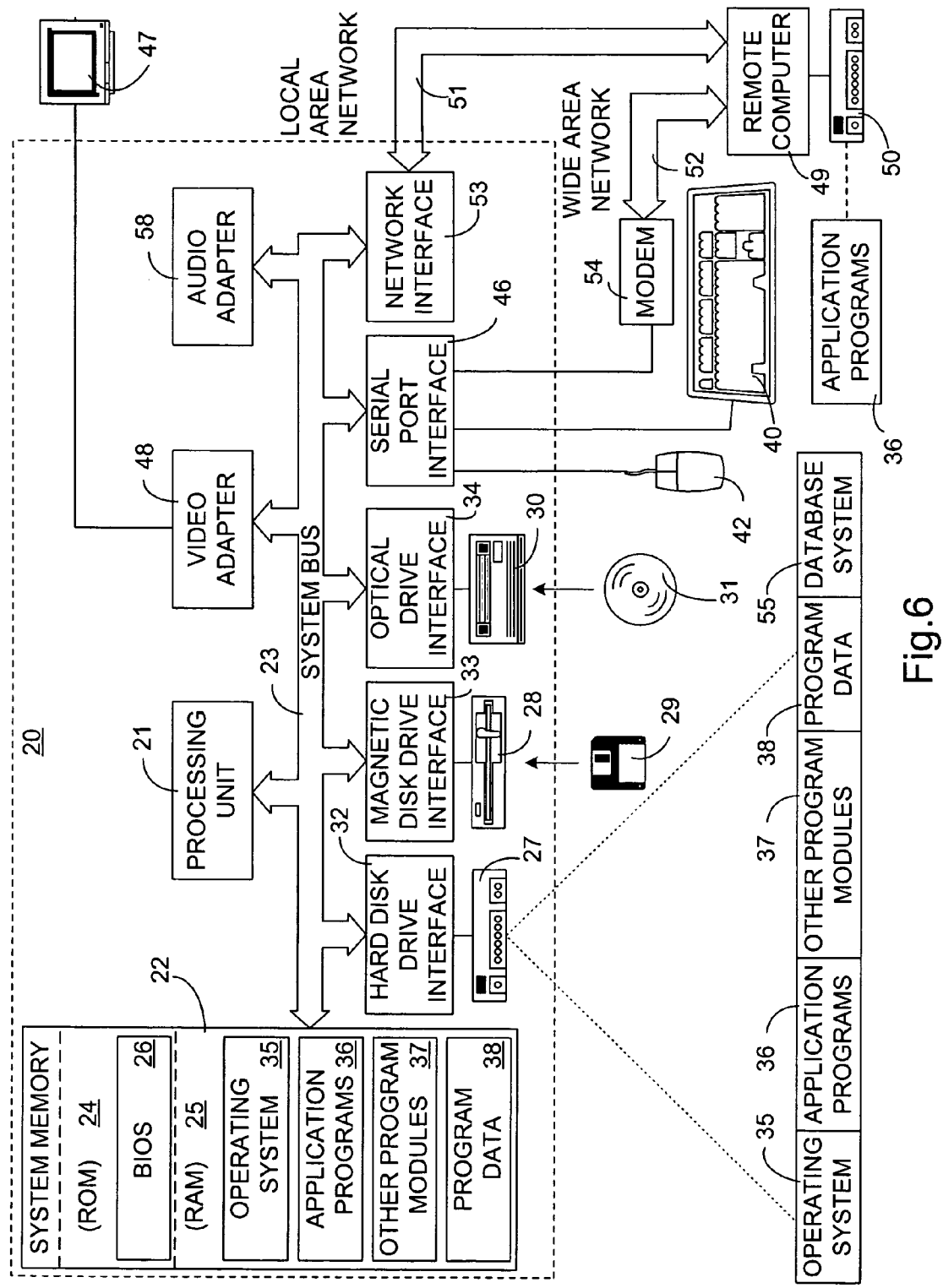
FIG. 6 illustrates an exemplary operating environment for a database monitoring system of the present invention.

FIG. 6 and the following discussion are intended to provide a brief, general description of a suitable computing environment in which the invention can be implemented. Although not required, the invention will be described in the general context of computer-executable instructions, such as program modules, being executed by a personal computer. Generally, program modules include routines, programs, objects, components, data structures, etc., that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 6, an exemplary system for implementing the invention includes a general purpose computing device in the form of a conventional personal computer 20, including a processing unit 21, a system memory 22, and a system bus 23 that couples various system components including system memory 22 to processing unit 21. System bus 23 may be any of several types of bus structures including a memory bus or memory controller, a peripheral bus, and a local bus using any of a variety of bus architectures. System memory 22 includes read only memory (ROM) 24 and random access memory (RAM) 25. A basic input/output system (BIOS) 26, containing the basic routines that help to transfer information between elements within personal computer 20, such as during start-up, is stored in ROM 24. Personal computer 20 further includes a hard disk drive 27 for reading from and writing to a hard disk, a magnetic disk drive 28 for reading from or writing to a removable magnetic disk 29 and an optical disc drive 30 for reading from or writing to a removable optical disc 31 such as a CD ROM or other optical media. Hard disk drive 27, magnetic disk drive 28, and optical disc drive 30 are connected to system bus 23 by a hard disk drive interface 32, a magnetic disk drive interface 33, and an optical drive interface 34, respectively. The drives and their associated computer-readable media provide nonvolatile storage of computer-readable instructions, data structures, program modules and other data for personal computer 20. Although the exemplary environment described herein employs a hard disk, a removable magnetic disk 29 and a removable optical disc 31, it should be appreciated by those skilled in the art that other types of computer-readable media which can store data that is accessible by computer, such as random access memories (RAMs), read only memories (ROMs), and the like may also be used in the exemplary operating environment.

A number of program modules may be stored on the hard disk, magnetic disk 129, optical disc 31, ROM 24 or RAM 25, including an operating system 35, one or more application programs 36, other program modules 37, and program data 38. A database system 55 may also be stored on the hard disk, magnetic disk 29, optical disc 31, ROM 24 or RAM 25. A user may enter commands and information into personal computer 20 through input devices such as a keyboard 40 and pointing device 42. Other input devices may include a microphone, stylus, joystick, game pad, satellite dish, scanner, or the like. These and other input devices are often connected to processing unit 21 through a serial port interface 46 that is coupled to system bus 23, but may be connected by other interfaces, such as a parallel port, game port or a universal serial bus (USB). A monitor 47 or other type of display device is also connected to system bus 23 via an interface, such as a video adapter 48. In addition to the monitor, personal computers typically include other peripheral output devices such as speakers and printers.

Personal computer 20 may operate in a networked environment using logical connections to one or more remote computers, such as a remote computer 49. Remote computer 49 may be another personal computer, a server, a router, a network PC, a peer device or other common network node, and typically includes many or all of the elements described above relative to personal computer 20, although only a memory storage device 50 has been illustrated in FIG. 6. The logical connections depicted in FIG. 6 include local area network (LAN) 51 and a wide area network (WAN) 52. Such networking environments are commonplace in offices, enterprise-wide computer networks, intranets, and the Internet.

When using a LAN networking environment, personal computer 20 is connected to local network 51 through a network interface or adapter 53. When used in a WAN networking environment, personal computer 20 typically includes a modem 54 or other means for establishing communication over a wide area network 52, such as the Internet. Modem 54, which may be internal or external, is connected to system bus 23 via serial port interface 46 or a broadband connection. In a networked environment, program modules depicted relative to personal computer 20, or portions thereof, may be stored in remote memory storage device 50. It will be appreciated that the network connections shown are exemplary and other means of establishing a communications link between the computers may be used.

It can be seen from the foregoing description that a confidence value can be associated with a selectivity estimate solving a probability distribution of possible selectivity values that is derived by executing a query expression on a sample of tuples from the database. Although the present invention has been described with a degree of particularity, it is the intent that the invention include all modifications and alterations from the disclosed design falling within the spirit or scope of the appended claims.

We claim:

1. A method implemented at least in part by a processor executing computer-executable instructions stored in computer-readable storage media for selecting a query plan from at least two query plans, each of the at least two query plans having a query expression on a database, the method comprising:

computing a uniform random sample of database tuples by randomly sampling tuples from the database;

for each of the at least two query plans, deriving, by the processor, a probability distribution for possible selectivity values of the query expression by evaluating each query expression on the sample of database tuples to determine an observed selectivity for the sample of database tuples;

forming a probability density function based on the observed selectivity using Bayes's rule;

receiving a desired selectivity confidence threshold from a user input, wherein the desired selectivity confidence threshold represents a tradeoff between predictability and performance for query execution time;

evaluating, by the process, each of the derived probability distributions using the desired selectivity confidence threshold to derive an estimated selectivity for the derived probability distribution, wherein the estimated selectivity is derived by inverting a cumulative distribution function for the probability distribution and applying the inverted cumulative distribution function to the desired selectivity confidence threshold;

selecting one of the query plans from the at least two query plans based on the estimated selectivities and at least one crossover point, each at least one crossover point defining a selectivity where query execution time of one query plan is estimated to equal query execution time of another query plan of the at least two query plans; and executing the selected query plan to retrieve and store records from a database.

2. The method of claim 1 wherein the uniform random sample of database tuples is updated periodically when a predetermined number of database modifications have occurred.

3. The method of claim 1 wherein the probability density function is derived assuming a uniform prior distribution.

4. The method of claim 1 the probability density function is derived assuming a Jeffreys prior distribution.

5. The method of claim 1 wherein the uniform random sample is precomputed by:

uniformly randomly sampling tuples from a first relation in the database to form a first sample;

joining the first sample with tuples from one or more other relations in the database to which the first relation is connected transitively via foreign joins; and wherein when a query expression includes a join of the first and the one or more other relations, the query expression is evaluated on the join of the first sample and the one or more other relations.

6. One or more computer readable media comprising computer-executable instructions that when executed cause a computer to perform the method of claim 1.

7. A system for selecting a query plan from at least two query plans, each of the at least two query plans having a query expression executed on a database comprising:

a processor; and memory including software components that are executed by the processor, the memory including a query expression evaluator that evaluates for each of the at least two query plans the query expression on a sample of database tuples to determine an observed selectivity;

a probability distribution derivation module that derives a probability distribution of possible selectivity values for each of the query expressions based on the observed selectivity;

a probability distribution resolver that receives a user input indicating a desired selectivity confidence threshold determines estimated selectivities for the at least two query plans based on the desired selectivity confidence and the probability distribution, wherein the desired selectivity confidence threshold represents a tradeoff between predictability and performance for query execution time;

a query optimizer that selects one of the query plans from the at least two query plans based on the estimated selectivities and at least one crossover point, each at least one crossover point defining a selectivity at which query execution time of one query plan is estimated to equal query execution time of another query plan; and an execution engine that executes the selected query plan to retrieve and stores record from the database.

8. The system of claim 7 further comprising a database tuple sampler that samples tuples from the database to pre-compute the sample.

9. The system of claim 8 wherein the database tuple sampler randomly samples tuples from the database, wherein the sample of database tuples is updated periodically when a predetermined number of database modifications have occurred.

10. The system of claim 8 wherein the database tuple sampler includes a join sampling module that uniformly randomly samples tuples from a first relation in the database to form a first sample; joins the first sample with tuples from one or more other relations in the database to which the first relation is connected transitively via foreign joins; and wherein when a query expression includes a join of the first and the one or more other relations, the query expression is evaluated on the join of the first sample and the one or more other relations.

11. The system of claim 7 wherein the probability density derivation module forms a probability density function based the observed selectivity using Bayes's rule.

12. The system of claim 11 wherein the probability density function is derived assuming a uniform prior distribution.

13. The system of claim 11 wherein the probability density function is derived assuming a Jeffreys prior distribution.

14. The system of claim 7 wherein the probability distribution resolver determines the estimated selectivities by inverting a cumulative distribution function for the probability distribution and applying the cumulative distribution function on the desired selectivity confidence threshold.

15. One or more computer readable media having computer-executable instructions stored thereon for selecting a query plan from at least two query plans, each of the at least two query plans having a query expression executed on a database, the instructions, when executed on a computer execute steps comprising:

evaluating, for each of the at least two query plans, the query expression on a sample of database tuples to determine an observed selectivity;

for each of the at least two query plans, deriving a probability distribution of possible selectivity values of the query expression based on the observed selectivity;

receiving a desired selectivity threshold from a user input, wherein the confidence threshold provides user control over a tradeoff between predictability and performance for query execution time;

determining estimated selectivities for the at least two query plans based on the desired selectivity confidence threshold and the derived probability distributions, wherein the estimated selectivities are determined by inverting a cumulative distribution function for the probability distribution and applying the cumulative distribution function on the desired selectivity confidence threshold;

selecting one of the query plans from the at least two query plans based on the estimated selectivities and at least one crossover point, each at least one crossover point defining a selectivity at which query execution time of one query plan is estimated to equal query execution time of another query plan, and executing the selected query plan to retrieve and store records from the database.

16. The computer readable media of claim 15 wherein the instructions further comprise sampling tuples from the database to precompute the sample.

17. The computer readable media of claim 16 wherein the instructions comprise randomly sampling tuples from the database, wherein the sample of database tuples is updated periodically when a predetermined number of database modifications have occurred.

18. The computer readable media of claim 16 wherein the instructions further comprise uniformly randomly sampling tuples from a first relation in the database to form a first sample; joining the first sample with tuples from one or more other relations in the database to which the first relation is connected transitively via foreign joins; and wherein when a query expression includes a join of the first and the one or more other relations, the evaluating the query expression on the join of the first sample and the one or more other relations.

19. The computer readable medium of claim 15 wherein the probability distribution is derived by forming a probability density function based on the observed selectivity using Bayes's rule.

* * * * *